United States Patent [19]

Ogino

[11] Patent Number: 4,983,198

[45] Date of Patent: Jan. 8, 1991

[54] GLASS MELTING METHOD AND APPARATUS

[75] Inventor: Kazuo Ogino, Hinode, Japan

[73] Assignee: Hoya Corporation, Tokyo, Japan

[21] Appl. No.: 312,190

[22] Filed: Feb. 21, 1989

[30] Foreign Application Priority Data

Feb. 29, 1988 [JP] Japan ................................. 63-47119

[51] Int. Cl.$^5$ ............................................. C03B 5/167
[52] U.S. Cl. ...................................... 65/32.5; 65/136; 65/178; 65/326; 65/356
[58] Field of Search ........... 65/32.5, 135, 136, 374.12, 65/346, 347, 356, 157, 32.1, 178, 325, 326

[56] References Cited

U.S. PATENT DOCUMENTS

| | | | |
|---|---|---|---|
| 2,877,280 | 3/1959 | Eden | 65/136 |
| 2,982,522 | 5/1961 | Hamilton et al. | 65/178 |
| 3,171,731 | 3/1965 | Barger et al. | 65/356 X |
| 3,206,295 | 9/1965 | Mattern | 65/347 X |
| 3,233,993 | 2/1966 | Weidel | 65/178 |
| 3,293,017 | 12/1966 | Jenkins | 65/326 |
| 3,353,943 | 11/1967 | Loutte | 65/356 X |
| 3,716,349 | 2/1973 | Deeg et al. | 65/178 |
| 4,806,138 | 2/1989 | Miura et al. | 65/32.1 |

FOREIGN PATENT DOCUMENTS 0003350 1/1978 Japan ................................. 65/32.5

*Primary Examiner*—Joye L. Woodard
*Attorney, Agent, or Firm*—Nixon & Vanderhye

[57] ABSTRACT

In a method of and an apparatus for melting glass having high reducing activity when melted, a glass raw material charged into a melting vessel having a wall formed of platinum or alloy thereof is heated and melted. Oxygen gas is supplied to an outer surface of the melting vessel to raise oxygen partial pressure within an atmosphere surrounding the melting vessel. The oxygen gas is caused to penetrate through the wall of the melting vessel, thereby supplying the penetrated oxygen to a layer of the molten glass which is in contact with an inner surface of the wall of the melting vessel, so that the layer of the molten glass is formed into a protective glass layer rich in oxygen, for protecting the wall of the melting vessel from the molten glass.

16 Claims, 1 Drawing Sheet

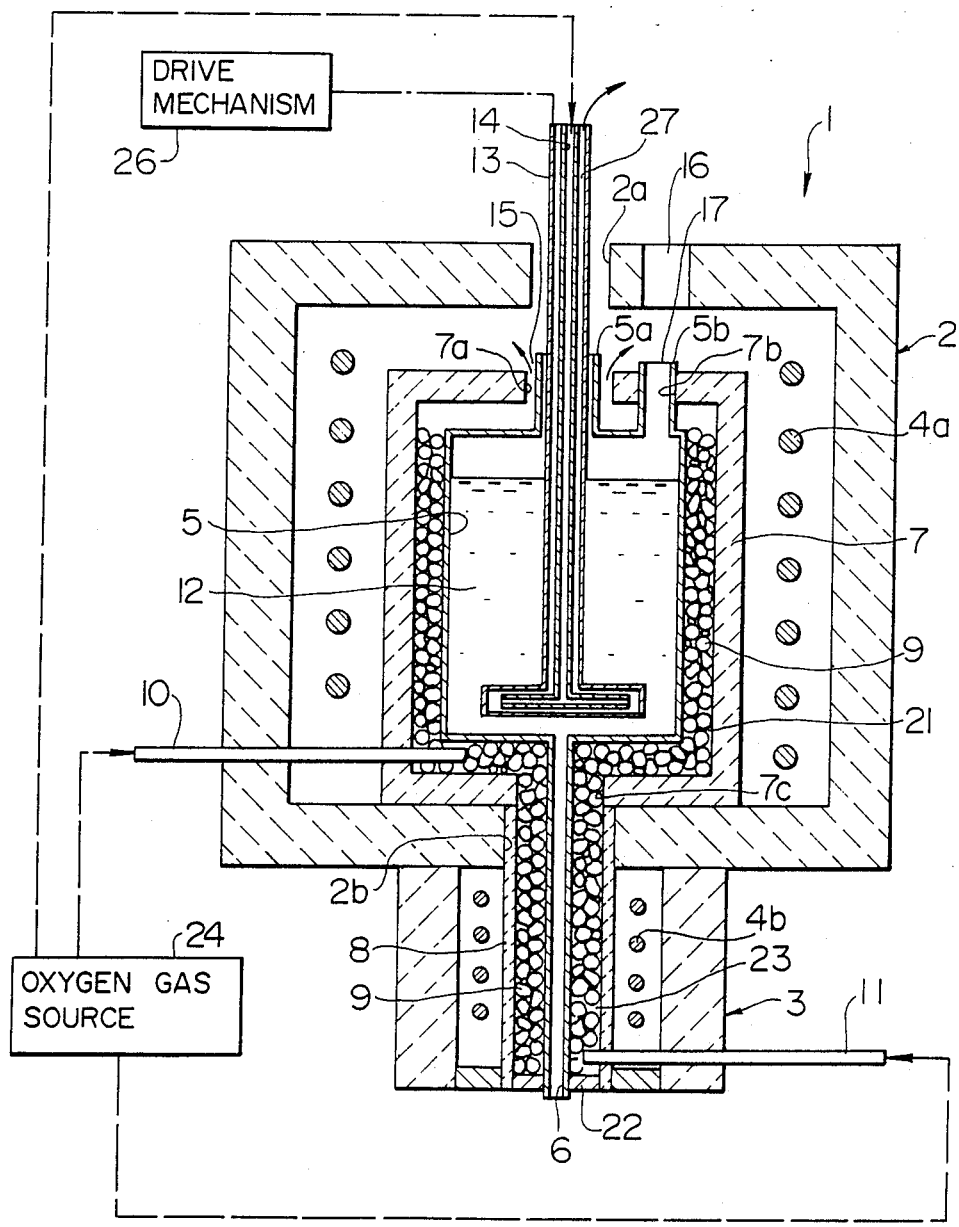

GLASS MELTING METHOD AND APPARATUS

BACKGROUND OF THE INVENTION

The present invention relates to a method of and an apparatus for melting glass having high reducing activity when melted, such as, for example, phosphate glass.

Generally, a glass of high optical quality having no striae, bubbles and so on is produced in the following manner. That is, a melting vessel formed of platinum or alloy thereof is accommodated in a protective case formed of refractory material. The melting vessel and the protective case are arranged within a melting furnace. Glass raw material is charged into the melting vessel, and is heated by an SiC resistance heating element or the like, to melt the glass raw material. The molten glass is further defoamed and homogenized.

Phosphate glass having reducing activity particularly strong when melted is highly reactive, and tends to react with the platinum or alloy thereof of the melting vessel to form a platinum-phosphorus alloy. A melting point of the platinum-phosphorus alloy is 588° C. which is extremely low. Accordingly, if the melting vessel and a stirring rod, which are formed of platinum or alloy thereof, are employed to melt the phosphate glass, the inner surface of the wall of the melting vessel and an outer peripheral surface of the stirring rod in contact with the molten glass turn into a platinum-phosphorus alloy which has the low melting point. Thus, the melting vessel and the stirring rod are broken off locally for a short period of time. Additionally or alternatively, cracks are developed locally in the melting vessel and the stirring rod for a short period of time.

For the reason discussed above, the melting vessel and the stirring rod formed of platinum or alloy thereof are not used in melting the phosphate glass with strong reducing activity. Employed to melt such glass are a pot or a crucible and a stirring rod formed of ceramic such as clay, quartz glass or the like, or a melting vessel or a stirring rod formed or iridium or alloy thereof which is disclosed in West German Patent DE No. 1,906,717.

When the ceramic melting vessel such as clay crucible, quartz glass crucible or the like and the ceramic stirring rod are used to melt the phosphate glass having particularly strong reducing activity when melted, there arises the following problem. That is, the crucible and the stirring rod are eroded violently under strong erosion activity of the molten phosphate glass, so that the components of the melting vessel and the stirring rod are dissolved into the molten glass, resulting in striae, bubbles and so on. Thus, the optical quality of the molten glass is deteriorated considerably.

Further, if the phosphate glass having strong reducing activity is melted by the use of the melting vessel and the stirring rod formed of iridium or alloy thereof, it is possible to obtain a glass of high optical quality. However, there are the following problems. That is, the iridium and alloy thereof are extremely expensive as compared with the platinum and alloy thereof. In addition, the iridium or alloy thereof is a hard material and is low in workability so that it is difficult to obtain each of the melting vessel and the stirring rod with a large and complicated configuration.

Furthermore, there is also the following problem. That is, the iridium or alloy thereof tends to be oxidized so that the outer surface of the melting vessel is required to be coated with metal such as rhodium or the like. Thus, it takes a long time and much labor in manufacture of the melting vessel.

SUMMARY OF THE INVENTION

It is therefore an object of the invention to provide a method of and an apparatus for melting glass having high reducing activity when melted, which are capable of obtaining a glass of high optical quality at low cost.

For the above purpose, according to the invention, there is provided a method of melting glass having high reducing activity when melted, the method comprising the steps of:
charging a glass raw material into a melting vessel having a wall formed of either one of platinum and alloy thereof;
heating the glass raw material within the melting vessel to melt it; and
supplying oxygen gas to an outer surface of the melting vessel to raise oxygen partial pressure within an atmosphere surrounding the melting vessel so as to cause the oxygen gas to penetrate through the wall of the melting vessel, thereby supplying the penetrated oxygen to a layer of the molten glass which is in contact with an inner surface of the wall of the melting vessel, so that the layer of the molten glass is formed into a protective glass layer rich in oxygen, for protecting the wall of the melting vessel from the molten glass.

According to the invention, there is also provided an apparatus for melting glass having high reducing activity when melted, the apparatus comprising:
a melting vessel to be charged with a glass raw material, the melting vessel having a wall formed of either one of platinum and alloy thereof;
means for heating the glass raw material within the melting vessel to melt it;
surrounding means arranged to surround the melting vessel and cooperating with an outer surface of the wall of the melting vessel to define a space between the surrounding means and the melting vessel; and
supply means for supplying oxygen gas to the space to raise oxygen partial pressure therewithin so as to cause oxygen gas to penetrate through the wall of the melting vessel, thereby supplying the penetrated oxygen to a layer of the molten glass which is in contact with an inner surface of the wall of the melting vessel, so that the layer of the molten glass is formed into a protective glass layer rich in oxygen, for protecting the wall of the melting vessel from the molten glass.

As described above, the arrangement of the invention is such that the glass is melted while the oxygen gas is supplied to the outer surface of the melting vessel formed of platinum or alloy thereof, or to the space between the surrounding means and the melting vessel. With such arrangement, the inner surface of the melting vessel in contact with the molten glass is protected by the protective glass layer rich in oxygen, thereby making it possible to melt the glass having high reducing activity when melted, by the use of the melting vessel having the wall formed of platinum or alloy thereof, which has been impossible until now. Thus, glass of high optical quality can be produced at low cost, without utilizing either a ceramic melting vessel which deteriorates the optical quality of the glass, or a melting vessel formed of iridium or alloy thereof which is expensive and low in workability.

BRIEF DESCRIPTION OF THE DRAWING

Single Figure is a somewhat diagrammatic cross-sectional view of a glass melting apparatus according to an embodiment of the invention.

DETAILED DESCRIPTION

Regarding permeability of oxygen through platinum (Pt), L. R. Velho and R. W. Bartlett have found out oxygen permeability depending upon diffusion in a range of from 1435° C. to 1504° C. by the use of a mass spectroscopy, in the Metallurge. Trans. 3 (1972) 65. Further, R. J. Brook, W. L. Pelzman and F. A. Kröger have found out oxygen permeability in a range of from 500° C. to 700° C. by a method using a solid-electrolyte cell, in J. Electrochem. Soc. 118 (1971) 185. Accordingly, it is considered that, if oxygen partial pressure within an atmosphere surrounding a melting vessel is raised under high temperature at which glass is melted, considerable oxygen is caused to penetrate through a wall of the melting vessel. The invention has perceived this point. Specifically, if a space surrounding the melting vessel is brought to an atmosphere of high oxygen concentration, the oxygen is caused to penetrate through the wall of the melting vessel, and a layer of the molten glass in contact with an inner surface of the wall of the melting vessel formed of platinum or alloy thereof becomes rich in oxygen, so that the layer of the molten glass is formed into a protective glass layer for protecting the wall of the melting vessel from the molten glass. Accordingly, reducing phosphorous oxide in the molten glass, which has the oxidation number of $+3$ or $+4$ is supplied with oxygen from the oxygen-rich layer of the molten glass which is in the vicinity of the inner wall surface of the melting vessel, so that the layer of the molten glass is formed into phosphorous oxide having the oxidation number of $+5$. Since the inner surface of the wall of the melting vessel formed of platinum or alloy thereof is protected by the oxygen-rich glass layer, the inner wall surface of the melting vessel can be prevented from being brought into direct contact with the reducing phosphorous oxide. Accordingly, the platinum or alloy thereof at the inner wall surface of the melting vessel is prevented from being bonded to the phosphorous oxide to form a platinum-phosphorus alloy. Thus, the melting vessel can effectively be prevented from being broken off or cracked locally.

Meanwhile, it is required that phosphate glass utilizing light absorption due to $Fe^{2+}$ therein, such as, for example, heat-wave absorption glass has reducing property. The reason for this is that, if it has oxidizing property, $Fe^{2+}$ is brought to $F^{3+}$, making it impossible to obtain a desirable light absorption curve. Accordingly, melting within an oxidizing atmosphere should be avoided in order to melt the glass while retaining its reducing property.

The arrangement of the invention is such that, in order to protect the melting vessel formed of platinum or alloy thereof, the oxygen caused to penetrate through the wall of the melting vessel is supplied to the layer of the molten glass in the vicinity of the inner wall surface of the melting vessel. Although the oxygen caused to penetrate through the wall of the melting vessel is extremely small in quantity, the quantity is sufficient to shift $P^{3+}$ and $P^{4+}$ within the layer of the molten glass in the vicinity of the inner wall surface of the melting vessel, to $P^{5+}$. The quantity is also sufficient to weaken the reactivity of the glass to the wall formed of platinum or alloy thereof.

On the other hand, if the oxygen partial pressure within an atmosphere on a surface of the molten glass is high, a larger quantity of oxygen beyond comparison with that caused to penetrate through the wall of the melting vessel is introduced into the molten glass through the surface thereof. Accordingly, in case of the heat-wave absorption glass containing $Fe^{2+}$, undesirable shift of $Fe^{2+}$ to $Fe^{3+}$ takes place. In carrying the invention into effect, when the oxygen gas is supplied to the atmosphere surrounding the melting vessel, the oxygen partial pressure in an atmosphere within a melting furnace is raised. For this reason, it is preferable that an opening of the melting vessel is restricted to a requisite minimum size, in order to avoid contact between the atmosphere of high oxygen partial pressure and the molten glass. By doing so, even if the glass to be melted is an $Fe^{2+}$-containing phosphate glass with strong reducing activity, the invention makes it possible to use the melting vessel formed of platinum or alloy thereof to produce the glass high in quality having no striae and bubbles, without the platinum or alloy thereof being eroded.

Referring to a single Figure, there is shown in cross-section an apparatus 1 for melting glass having high reducing activity when melted, such as, for example, phosphate glass, according to an embodiment of the invention. The glass melting apparatus 1 comprises a melting furnace 2 formed of refractory material. The melting furnace 2 has a top wall provided therein with an insertion opening 2a and a charging port 16, and a bottom wall provided therein with a fitting bore 2b.

An outflow furnace 3 formed of refractory material is attached to the melting furnace 2 in coaxial relation to the fitting bore 2b in the bottom wall of the melting furnace 2.

A melting vessel 5 formed of platinum or alloy thereof is arranged within the melting furnace 2. The melting vessel 5 has a top wall provided with a pair of tubular sections 5a and 5b. The tubular section 5a is vertically aligned with the insertion opening 2a in the top wall of the melting furnace 2, and the tubular section 5b defines a charging port 17 which is vertically aligned with the charging port 16 in the top wall of the melting furnace 2. The melting vessel 5 has a bottom wall to which an outflow pipe 6 is connected. The outflow pipe 6 is formed of platinum or alloy thereof and extends vertically downwardly from the bottom wall of the melting vessel 5 through the fitting bore 2b in the bottom wall of the melting furnace 2. To be described later, glass raw material, which may include scrap glass, is charged into the melting vessel 5 through the vertically aligned charging ports 16 and 17.

A surrounding protective case 7 formed of refractory material is accommodated in the melting furnace 2 and is so arranged as to surround the melting vessel 5. The surrounding protective case 7 has a top wall formed therein with a bore 7a which is vertically aligned with the insertion opening 2a in the top wall of the melting furnace 2. The tubular section 5a on the top wall of the melting vessel 5 is fitted in the bore 7a to define an annular discharge port 15 for oxygen gas to be described later, between a wall surface of the bore 7a and an outer peripheral surface of the tubular section 5a. Further, the top wall of the surrounding protective case 7 is formed with a bore 7b in which the tubular section 5b on the top wall of the melting vessel 5 is fitted. The surrounding protective case 7 has a bottom wall resting on the bottom wall of the melting furnace 2. The bottom wall of the surrounding protective case 7 is formed with a bore 7c vertically aligned with the fitting bore 2b in the bottom wall of the melting furnace 2. The surrounding protective case 7 has an inner surface which cooperates with an outer surface of the melting vessel 5 to define a predetermined gap or space 21 between the surrounding protective case 7 and the melting vessel 5.

A tubular protective case 8 formed of refractory material has an upper portion which is fitted in the fitting bore 2b in the bottom wall of the melting furnace 2. The upper portion of the tubular protective case 8 has an end which is connected to the bore 7c in the bottom wall of the surrounding protective case 7. The remaining portion of the tubular protective case 8 is accommodated in the outflow furnace 3. The outflow pipe 6 extends through the bore 7c in the bottom wall of the surrounding protective case 7 in concentric relation to the bore 7c, and through the tubular protective case 8 in concentric relation thereto. The outflow pipe 6 has a lower end which extends through an end closure 22 at a lower end of the tubular protective case 8. The tubular protective case 8 cooperates with an outer peripheral surface of the outflow pipe 6 to define a predetermined gap or space 23 between the tubular protective case 8 and the outflow pipe 6 in such a manner that the spaces 21 and 23 communicate with each other. The spaces 21 and 23 are filled with metal oxide particles or spherical filler 9 formed of alumina, which does not react with the wall of the melting vessel 5 and the wall of the outflow pipe 6.

An SiC resistance heating element 4a is arranged within the melting furnace 2 and about the surrounding protective case 7, for heating the glass raw material within the melting vessel 5 to melt the glass raw material, thereby forming molten glass 12. Another SiC resistance heating element 4b is arranged within the outflow furnace 3 and about the tubular protective case 8, for heating the glass within the outflow pipe 6.

A supply pipe 10 formed of platinum, platinum alloy or high-refractory metal oxide extends through the peripheral wall of the melting furnace 2 and the peripheral wall of the surrounding protective case 7. The supply pipe 10 has a forward end which opens to a portion of the space 21 between the wall of the melting vessel 5 and the wall of the surrounding protective case 7. The other end of the supply pipe 10 communicates with a source of oxygen gas 24. Thus, the space 21 is supplied with oxygen gas from the source 24 through the supply pipe 10. Likewise, a supply pipe 11 formed of platinum, platinum alloy or high-refractory metal oxide extends through the peripheral wall of the outflow furnace 3 and the peripheral wall of the tubular protective case 8. The supply pipe 11 has a forward end which opens to a bottom portion of the space 23. The other end of the supply pipe 11 communicates with the source of oxygen gas 24. Thus, the space 23 is supplied with the oxygen gas from the source 24 through the supply pipe 11.

The top wall of the melting vessel 5 is substantially closed, except for the tubular sections 5a and 5b, in order to isolate a surface of the molten glass 12 from the oxygen gas supplied to the spaces 21 and 23 through the respective supply pipes 10 and 11.

In connection with the above, the platinum or alloy thereof used in the wall of the melting vessel 5 or the wall of the outflow pipe 6 has weak strength and is liable to be deformed at melting temperature of the glass material within the melting vessel 5, which exceeds 1000° C. The spherical filler 9 filled with the spaces 21 and 23 serves as reinforcement for the wall of the melting vessel 5 and the wall of the outflow pipe 6, which are formed of platinum or alloy thereof. Further, the spherical filler 9 serves also to bring the oxygen gas supplied through the supply pipes 10 and 11 into contact uniformly with the entire outer surface of the melting vessel 5 and the entire outer peripheral surface of the outflow pipe 6.

An stirring rod 13 formed of platinum or alloy thereof is associated with the melting vessel 5 for homogenizing the molten glass 12 therewithin. Specifically, the stirring rod 13 has an inverted T-shaped lower end portion which is immersed in the molten glass 12. An upper end portion of the stirring rod 13 extends through the tubular section 5a on the top wall of the melting vessel 5 and through the insertion opening 2a in the top wall of the melting furnace 2. The upper end of the stirring rod 13 is connected to a drive mechanism 26 for rotating the stirring rod 13.

The stirring rod 13 is hollow, and the hollow portion of the stirring rod 13 is supplied with the oxygen gas from the source 24. Specifically, a supply pipe 14 is arranged within the hollow portion of the stirring rod 13 in concentric relation thereto in such a manner that an outer peripheral surface of the supply pipe 14 cooperates with the wall surface of the hollow portion of the stirring rod 13 to define an annular return passage 27 between the supply pipe 14 and the inner wall of the stirring rod 13. The supply pipe 14 has an upper end connected to the source of oxygen gas 24, and an inverted T-shaped lower portion. A horizontal section of the inverted T-shaped lower portion has opposite ends which open to the hollow portion of the stirring rod 13. The arrangement is such that the oxygen gas supplied from the source 24 passes through the supply pipe 14, enters the hollow portion of the stirring rod 13 through the opposite open ends of the horizontal section of the inverted T-shaped lower portion, and is returned through the return passage 27.

An example of a glass melting method according to the invention will be described below in relation to melting of phosphate glass of strong reducing activity. Three kinds of glass raw materials A, B and C were used, of which compositions were as follows:

| Glass raw material | A | B | C |
| --- | --- | --- | --- |
| (1) P$_2$O$_5$ | 76.0 wt % | 76.0 wt % | 76.0 wt % |
| (2) Al$_2$O$_3$ | 11.1 | 11.1 | 11.1 |
| (3) B$_2$O$_3$ | 3.6 | 3.6 | 3.6 |
| (4) BaO | 1.5 | 1.5 | 1.5 |
| (5) MgO | 3.5 | 3.5 | 3.5 |
| (6) K$_2$O | 1.4 | 1.4 | 1.4 |
| (7) Fe$_2$O$_3$ | 2.9 | 2.9 | 2.9 |
| Total of (1) to (7) | 100 | 100 | 100 |
| (8) C (carbon) | 1.0 wt %* | 1.5 wt %* | 2.5 wt %* |

*wt % based on total of (1) to (7)

The glass melting apparatus used in this example has a same configuration as shown in the Figure. The size of the melting vessel 5 is such that an outer diameter is 170 mm, a height is 250 mm and an inner volume of 5 liters. The surrounding protective case 7 is 250 mm in outer diameter, 200 mm in inner diameter and 350 mm in height. The melting furnace 2 and the outflow furnace 3 were first heated respectively by the SiC resistance heating elements 4a and 4b in such a manner that temperature within the melting furnace 2 was maintained at 1350° C. and temperature within the outflow furnace 3 was maintained at 1000° C. Then, the oxygen gas was supplied, at a flow rate of 0.5 l/min, from the source 24 to the space 21 or the gap of 15 mm between the surrounding protective case 7 and the melting vessel 5, through the supply pipe 10, and to the space 23 or the gap of 15 mm between the tubular protective case 8 and the outflow pipe 6, through the supply pipe 11. Since the spaces 21 and 23 were filled with the spherical alumina filler 9 having a diameter of 3 mm, the oxygen gas supplied through the supply pipes 10 and 11 flowed through gaps among particles of the filler 9, and was discharged through the annular discharge port 15. The oxygen gas was obstructed in flow by the filler 9, was diffused over the entire outer surface of the melting vessel 5, and was caused to flow upwardly. Thus, the oxygen gas was not one-sided, but flowed in contact with the entire outer surface of the melting vessel 5 uniformly.

Moreover, the oxygen gas was supplied at a flow rate of 0.1 l/min from the source 24 into the stirring rod 13 through the supply pipe 14, to create flow of the oxygen gas within the stirring rod 13.

After the interior of the melting furnace 2 had been brought to the state described above, either one of the glass raw materials A, B and C was charged into the melting vessel 5 through the charging port 16 in the top wall of the melting furnace 2 and through the charging port 17 defined by the tubular section 5b on the top wall of the melting vessel 5. The charged glass raw material was supplied with heat from the SiC resistance heating element 4a and was melted and defoamed. The melting time was 1.5 hours. The molten glass 12 was homogenized under the action of the stirring rod 13. The oxygen gas supplied to the space 21 through the supply pipe 10 raised oxygen partial pressure therewithin. Oxygen of the supplied oxygen gas was caused to penetrate through the wall of the melting vessel 5, thereby supplying the penetrated oxygen to a layer of the molten glass 12 which was in contact with the inner wall surface of the melting vessel 5. Thus, the layer of the molten glass 12 was formed into a protective glass layer rich in oxygen, for protecting the wall of the melting vessel 5 from the molten glass 12. Likewise, the oxygen gas supplied to the space 23 through the supply pipe 11 raised oxygen partial pressure therewithin. The supplied oxygen gas was caused to penetrate through the wall of the outflow pipe 6, thereby supplying the penetrated oxygen to a layer of the molten glass 12 which was in contact with the inner wall surface of the outflow pipe 6. Thus, the layer of the molten glass was formed into a protective glass layer rich in oxygen, for protecting the wall of the outflow pipe 6 from the molten glass 12. Subsequently, the molten glass 12 was taken out of the melting vessel 5 through the outflow pipe 6. The molten glass 12 taken out of the melting vessel 5 was then formed into a predetermined shape.

After the molten glass 12 was taken out of the melting vessel 5, the surface of the inner wall of the melting vessel 5 and the outer peripheral surface of the supply pipe 14 were subjected to spectroscopic analysis and visual observation. The results are shown in below Table 1.

It is clear from Table 1 that when the raw glass materials A, B and C (corres. to Experiment Nos. 1, 3 and 5, respectively) were melted while supplying oxygen, phosphorous was not detected and cracks were not observed at the inner surface of the wall of the melting vessel 5 and the outer peripheral surface of the supply pipe 14. This means that supplying oxygen prevents the formation of platinum-phosphorous alloy having low melting point.

Table 1 also shows the results obtained when the glass raw materials A, B and C (corres. to Experiment Nos. 2, 4 and 6, respectively) were melted without supplying oxygen. It is clear from Table 1 that when oxygen is not used in melting the glass raw materials A, B and C, phosphorous was detected and cracks were observed at the inner surface of the wall of the melting vessel 5 and the outer peripheral surface of the supply pipe 14.

TABLE 1

| Experiment No. | Glass raw material | Oxygen supplied to the space 21 | Oxygen supplied into the stirring rod 13 | Phosphorous detected by spectroscopic analysis (note 1) | Visual Observation |
|---|---|---|---|---|---|
| 1 | A | 0.5 l/min | 0.1 l/min | - (not detected) | no change |
| 2 | A | none | none | Tr⁻ | cracks observed |
| 3 | B | 0.5 l/min | 0.1 l/min | — | no change |
| 4 | B | none | none | Tr⁺ | cracks observed |
| 5 | C | 0.5 l/min | 0.1 l/min | — | no change |
| 6 | C | none | none | + (considerably detected) | cracks observed |

(note 1) Amount of phosphorous detected decreases in the following order:
+ > Tr⁺ > Tr > Tr⁻ > Tr⁼ > Tr⁼ > —

It is to be understood that the invention is not limited to the above-described specific embodiment, but various changes and modifications can be made to the invention. For example, each of the supply pipes 10 and 11 may be replaced by a supply pipe which has a closed end on the furnace side and is formed with bores or orifices of 0.5 mm at intervals of 20 mm along the length of the supply pipe and which is wound about the outer peripheral surface of the melting vessel 5 or the outflow pipe 6.

Further, the sizes and the configurations of the melting vessel 5, the outflow pipe 6, the protective cases 7 and 8, the supply pipes 10 and 11 and so on are not limited to the embodiment described above.

Moreover, the positions of the respective supply pipes 10 and 11 are not particularly limited, if the supply pipes 10 and 11 are located respectively at the lower portions of the melting vessel 5 and the tubular protective case 8.

Furthermore, the filler 9 may be of material, particle configuration and particle size which are different from those mentioned above. That is, the material may be ceramic such as quartz glass, zirconia or the like, in addition to the alumina. The particle configuration may be a different one, if gaps sufficient to secure flow of the oxygen gas are formed among the particles when the filler 9 is filled in the spaces 21 and 23. The particle size may be a different one, if flow of the oxygen gas is sufficiently secured, similarly to the particle configuration.

Further, the oxygen gas is not required to be pure oxygen gas, but may more or less be mixed with inert gas such as nitrogen gas, argon gas or the like. The mixture ratio is determined depending upon reducing activity of glass to be melted.

Furthermore, an amount of supply of the oxygen gas should be determined depending upon the size of the melting vessel 5 and reducing activity of glass to be melted.

What is claimed is:

1. A method of melting phosphate glass having high reducing activity when melted, said method comprising the steps of:
    charging a phosphate glass raw material into a melting vessel having a wall formed of either one of platinum and alloy thereof;
    heating the phosphate glass raw material within said melting vessel to melt it; and
    supplying oxygen gas to an outer surface of said melting vessel to raise oxygen partial pressure within an atmosphere surrounding said melting vessel so as to cause the oxygen gas to penetrate through the wall of said melting vessel, thereby supplying the penetrated oxygen to a layer of the molten phosphate glass which is in contact with an inner surface of the wall of said melting vessel, the concentration of oxygen being sufficient so that the layer of the molten phosphate glass is formed into a protective glass layer rich in oxygen, for protecting the wall of said melting vessel from the molten phosphate glass.

2. An apparatus for melting phosphate glass having high reducing activity when melted, said apparatus
    a melting vessel to be charged with a phosphate glass raw material, said melting vessel having a wall formed of either one of platinum and alloy thereof;
    means for heating the phosphate glass raw material within said melting vessel to melt it;
    surrounding means arranged to surround said melting vessel and cooperating with an outer surface of the wall of said melting vessel to define a first space between said surrounding means and said melting vessel;
    supply means for supplying oxygen gas to said space to raise oxygen partial pressure therewithin so as to cause the oxygen gas to penetrate through the wall of said melting vessel, thereby supplying the penetrated oxygen to a layer of the molten phosphate glass which is in contact with an inner surface of the wall of said melting vessel, so that the layer of the molten phosphate glass is formed into a protective glass layer rich in oxygen, for protecting the wall of said melting vessel from the molten phosphate glass; and
    said melting vessel including a substantially closed top wall for isolating a surface of the molten phosphate glass from said oxygen gas.

3. An apparatus according to claim 2, wherein said first space is filled with metal oxide particles which do not react with the wall of said melting vessel.

4. An apparatus according to claim 2, wherein said surrounding means is composed of a surrounding protective case formed of refractory material.

5. An apparatus according to claim 4, further comprising a melting furnace in which said melting vessel and said surrounding protective case are accommodated, wherein said supply means includes a supply pipe extending through a wall of said melting furnace and a wall of said surrounding protective case.

6. An apparatus according to claim 5, wherein said supply pipe is formed of either one of platinum, platinum alloy and high-refractory metal oxide.

7. An apparatus according to claim 2, further comprising a hollow stirring rod for homogenizing the molten phosphate glass within said melting vessel, and second supply means for supplying oxygen gas into the hollow portion of said stirring rod.

8. An apparatus according to claim 7, wherein said stirring rod is formed of either one of platinum and alloy thereof.

9. An apparatus according to claim 7, wherein said second supply means includes a supply pipe arranged within the hollow portion of said stirring rod in such a manner that said supply pipe extends along an axis of said stirring rod, said supply pipe having an outer peripheral surface cooperating with a wall surface of the hollow portion of said stirring rod to define a return passage between said supply pipe and said stirring rod, the oxygen gas supplied through said supply pipe being returned through said return passage.

10. An apparatus according to claim 2, further comprising an outflow pipe formed of either one of platinum and alloy thereof and connected to a bottom of said melting vessel, for discharging the molten phosphate glass from said melting vessel, a tubular protective case formed of refractory material and arranged in such a manner that said outflow pipe extends along an axis of said tubular protective case, said tubular protective case having a wall cooperating with an outer peripheral surface of said outflow pipe to define a second space between said tubular protective case and said outflow pipe, and second supply means for supplying oxygen gas into said second space.

11. An apparatus for melting phosphate glass having high reducing activity when melted, said apparatus comprising:
    a melting vessel to be charged with a phosphate glass raw material, said melting vessel having a wall formed of either one of said platinum and alloy thereof;
    means for heating the phosphate glass raw material within said melting vessel to melt it;
    surrounding means arranged to surround said melting vessel and cooperating with an outer surface of the wall of said melting vessel to define a first space between said surrounding means and said melting vessel;
    first supply means for supplying oxygen gas to said space to raise oxygen partial pressure therewithin so as to cause the oxygen gas to penetrate through the wall of said melting vessel, thereby supplying the penetrated oxygen to a layer of the molten phosphate glass which is in contact with an inner surface of the wall of said melting vessel, so that the layer of the molten phosphate glass is formed into a protective glass layer rich in oxygen, for protecting the wall of said melting vessel from the molten phosphate glass;
    an outflow pipe formed of either one of platinum and alloy thereof and connected to a bottom of said melting vessel, for discharging the molten phosphate glass from said melting vessel, a tubular protective case formed of refractory material and arranged in such a manner that said outflow pipe extends along an axis of said tubular protective case, said tubular protective case having a wall cooperating with an outer peripheral surface of said outflow pipe to define a second space between said tubular protective case and said outflow pipe; and second supply means for supplying oxygen gas into said second space.

12. An apparatus according to claim 11, wherein said surrounding means is comprised of a surrounding protective case formed of refractory material, said tubular protective case being connected to a bottom of said surrounding protective case in such a manner that said first and second spaces communicate with each other.

13. An apparatus according to claim 12, wherein said first and second spaces are filled with metal oxide particles which do not react with the wall of said melting vessel and a wall of said outflow pipe.

14. An apparatus according to claim 13, further comprising a melting furnace in which said melting vessel and said surrounding protective case are accommodated, said melting furnace having a bottom formed with a bore in which an upper portion of said tubular protective case is fitted, and an outflow furnace arranged on an outer surface of the bottom of said melting furnace, the remaining portion of said tubular protective case being accommodated in said outflow furnace, wherein said oxygen supply means for said first space includes a supply pipe extending through a wall of said melting furnace and a wall of said surrounding protective case, and wherein said second supply means includes a supply pipe extending through a wall of said outflow furnace and the wall of said tubular protective case.

15. An apparatus for melting phosphate glass having high reducing activity when melted, said apparatus comprising:

a melting vessel to be charged with a phosphate glass raw material, said melting vessel having a wall formed of either one of platinum and alloy thereof;

means for heating the phosphate glass raw material within said melting vessel to melt it;

surrounding means arranged to surround said melting vessel and cooperating with an outer surface of the wall of said melting vessel to define a space between said surrounding means and said melting vessel, said space being filled with metal oxide particles which do not react with the wall of said melting vessel; and supply means for supplying oxygen gas to said space to raise oxygen partial pressure therewithin so as to cause the oxygen gas to penetrate through the wall of said melting vessel, thereby supplying the penetrated oxygen to a layer of the molten phosphate glass which is in contact with an inner surface of the wall of said melting vessel, so that the layer of the molten phosphate glass is formed into a protective glass layer rich in oxygen, for protecting the wall of said melting vessel from the molten phosphate glass.

16. An apparatus according to claim 15, wherein said metal oxide particles are formed of at least one of alumina, quarts glass and zirconia.

* * * * *